US012106916B2

(12) United States Patent
Li et al.

(10) Patent No.: US 12,106,916 B2
(45) Date of Patent: Oct. 1, 2024

(54) RELAY PROTECTIVE DEVICE, CONSTRUCTION MACHINE, RELAY PROTECTION CONTROL METHOD AND APPARATUS

(71) Applicant: XUZHOU XCMG EXCAVATOR MACHINERY CO., LTD, Jiangsu (CN)

(72) Inventors: Yadong Li, Jiangsu (CN); Jiawen Geng, Jiangsu (CN); Jian Zhang, Jiangsu (CN); Bujun Dong, Jiangsu (CN); Yuzhong Dong, Jiangsu (CN); Fanjian Meng, Jiangsu (CN); Feifei Zhao, Jiangsu (CN); Meng Wen, Jiangsu (CN)

(73) Assignee: XUZHOU XCMG EXCAVATOR MACHINERY CO., LTD, Jiangsu (CN)

( * ) Notice: Subject to any disclaimer, the term of this patent is extended or adjusted under 35 U.S.C. 154(b) by 231 days.

(21) Appl. No.: 17/800,713

(22) PCT Filed: Feb. 7, 2021

(86) PCT No.: PCT/CN2021/075792
§ 371 (c)(1),
(2) Date: Aug. 18, 2022

(87) PCT Pub. No.: WO2021/169781
PCT Pub. Date: Sep. 2, 2021

(65) Prior Publication Data

US 2023/0352257 A1 Nov. 2, 2023

(30) Foreign Application Priority Data

Feb. 28, 2020 (CN) ........................ 202010126706.8

(51) Int. Cl.
*H01H 47/02* (2006.01)
*H01H 47/22* (2006.01)

(52) U.S. Cl.
CPC ....... *H01H 47/22* (2013.01); *H01H 2047/025* (2013.01)

(58) Field of Classification Search
CPC ...... H01H 47/226; H01H 47/22; H01H 47/02; H01H 2047/006; H01H 2047/025
(Continued)

(56) References Cited

U.S. PATENT DOCUMENTS 4,144,552 A * 3/1979 Sibalis .................. H01H 47/14 327/402
6,397,665 B1 * 6/2002 Kirts .................... G01N 29/223 73/579

(Continued)

FOREIGN PATENT DOCUMENTS

CN 202134472 U 2/2012
CN 104941200 A 3/2015

(Continued)

OTHER PUBLICATIONS

International Preliminary Report on Patentability for International Appl No. PCT/CN2021/075792 dated Aug. 30, 2022 and Written Opinion of the International Searching Authority dated Apr. 25, 2021 (6 pages).

(Continued)

*Primary Examiner* — Gabriel Agared
(74) *Attorney, Agent, or Firm* — Merchant & Gould P.C.

(57) ABSTRACT

The present invention relates to a relay protective device, a construction machine, a relay protection control method and apparatus, and a computer readable storage medium. The relay protective device includes: a power supply input contact; a relay protective module comprising a bistable (Continued)

relay and an output contact, wherein the bistable relay comprises a contact, a pull-in coil, and a release coil; an input terminal of the contact, an input terminal of the pull-in coil, and an input terminal of the release coil are connected to the power supply input contact; an output terminal of the contact is connected to the output contact; and a central control unit comprising a first port connected to the output contact, a second port connected to an output terminal of the pull-in coil, and a third port connected to an output terminal of the release coil; the central control unit is used for controlling the pull-in coil and the release coil to be alternately powered on so as to oscillate the contact when a voltage of the output contact is less than a first threshold and is not less than a second threshold, wherein the first threshold is less than a standard working voltage of the bistable relay, and the second threshold is the minimum allowable working voltage of the bistable relay.

17 Claims, 4 Drawing Sheets

(58) Field of Classification Search
USPC .......................................................... 361/31
See application file for complete search history.

(56) References Cited

U.S. PATENT DOCUMENTS

| | | | | |
|---|---|---|---|---|
| 2004/0016865 | A1* | 1/2004 | Little | G01J 1/0403 250/203.1 |
| 2015/0055267 | A1 | 2/2015 | Beauregard et al. | |
| 2017/0125146 | A1* | 5/2017 | Shiki | E02F 3/965 |
| 2018/0134252 | A1* | 5/2018 | Theodosiou | E05F 15/00 |
| 2019/0080868 | A1 | 3/2019 | Riley | |

FOREIGN PATENT DOCUMENTS

| | | | | |
|---|---|---|---|---|
| CN | 207009367 | U | 2/2018 | |
| CN | 110729714 | A | 1/2020 | |
| CN | 111192794 | A | 5/2020 | |
| DE | 10101353 | A1 | 7/2002 | |
| EP | 2840584 | A2 | 2/2015 | |
| EP | 2840584 | B1 * | 3/2021 | H01H 47/22 |

OTHER PUBLICATIONS

Extended European Search Report dated Feb. 2, 2024 for EP Application No. 21761226.6 (13 pages).

* cited by examiner

RELAY PROTECTIVE DEVICE, CONSTRUCTION MACHINE, RELAY PROTECTION CONTROL METHOD AND APPARATUS

CROSS-REFERENCE TO RELATED APPLICATIONS

The application is a National Stage Application of PCT/CN2021/075792, filed on Feb. 7, 2021, which claims priority benefit to Chinese application No. CN202010126706.8, filed on Feb. 28, 2020, the disclosures of which are hereby incorporated by reference in their entireties.

TECHNICAL FIELD

The present disclosure relates to the technical field of electrical control of engineering machinery, and in particular, to a relay protective apparatus, an engineering machine, a relay protection control method and apparatus, and a non-transitory computer-readable storage medium.

BACKGROUND

With the development of technologies such as intelligent and integrated manufacturing, electrical control technology has been developed rapidly. As an important subsystem of an engineering machine, the electrical system plays a vital role in the performance of the engineering machine.

Taking an excavator as an example, three basic load circuits of its electrical system, namely its power supply circuit, preheating circuit and startup circuit, have the characteristics of large working current and high load impact. Relay protective apparatus is used for relay protection of these circuits to reduce the occurrence of faults and abnormal conditions.

SUMMARY

Embodiments of the present disclosure provide a relay protective apparatus, an engineering machine, a relay protection control method and apparatus, and a non-transitory computer-readable storage medium, so as to improve the reliability of the relay protective apparatus, prolong its service life, and further improve the reliability of the electrical system of the engineering machine.

According to an aspect of the embodiments of the present disclosure, a relay protective apparatus is provided, comprising:

- a power input connection point;
- a relay protection circuit, comprising a bistable relay and an output connection point, the bistable relay comprising a contact, a pull-in coil and a release coil, an input terminal of the contact, an input terminal of the pull-in coil and an input terminal of the release coil being connected to the power input connection point, an output terminal of the contact being connected to the output connection point;
- a central controller, comprising a first port connected to the output connection point, a second port connected to the output terminal of the pull-in coil, and a third port connected to the output terminal of the release coil, the central controller being used for, if a voltage of the output connection point is less than a first threshold and not less than a second threshold, controlling the pull-in coil and the release coil to be powered alternately to make the contact oscillate, wherein the first threshold is less than a standard operating voltage of the bistable relay, and the second threshold is a minimum allowable operating voltage of the bistable relay.

In some embodiments, the central controller is further used for triggering the pull-in coil to close the contact if the voltage of the output connection point is not less than the first threshold or the number of times the contact oscillating continuously is not less than a preset number of times.

In some embodiments, the central controller is used for acquiring the voltage of the output connection point at every preset interval.

In some embodiments, the relay protective apparatus further comprises: a fault indicator;

- wherein the central controller further comprises a fourth port connected to the fault indicator, and the central controller is also used for controlling the fault indicator to send a first fault indication information when the voltage of the output connection point is zero; and, when the voltage of the output connection point is greater than zero and less than the second threshold, controlling the fault indicator to a send second fault indication information.

In some embodiments, the fault indicator comprises an indicator light or a buzzer.

In some embodiments, the relay protection circuit further comprises a first storage capacitor, wherein the input terminal of the contact, the input terminal of the pull-in coil and the input terminal of the release coil are further connected to an output terminal of the first storage capacitor.

In some embodiments, the relay protection circuit further comprises a fuse-link connected in series with the bistable relay, wherein an input terminal of the fuse-link is connected to the output terminal of the contact, and an output terminal of the fuse-link is connected to the output connection point.

In some embodiments, the relay protective apparatus further comprises: a voltage regulator and a second storage capacitor, wherein an input terminal of the voltage regulator is used to connect to a power-on output terminal of a key switch;

the central controller further comprises a power port, which is connected to an output terminal of the voltage regulator and an output terminal of the second storage capacitor.

In some embodiments, the voltage regulator is a low dropout linear voltage regulator (LDO).

In some embodiments, three relay protection circuits are provided, namely a power circuit relay protection circuit, a startup circuit relay protection circuit, and a preheating circuit relay protection circuit;

the central controller further comprises a fifth port for connecting to a startup output terminal of the key switch, and a sixth port for communicating with a vehicle-mounted controller, wherein the central controller is used for controlling the power circuit relay protection circuit to work when receiving a power-on signal from the power-on output terminal of the key switch; controlling the startup circuit relay protection circuit to work when receiving a startup signal from the startup output terminal of the key switch in the power-on state; controlling the preheating circuit relay protection circuit to work when receiving a start-to-preheat signal from the vehicle-mounted controller in the power-on state.

In some embodiments, the sixth port of the central controller is used for connecting with the vehicle-mounted controller of the engineering machine through a controller area network (CAN) bus.

According to another aspect of the embodiments of the present disclosure, an engineering machine is provided, comprising the relay protective apparatus described in any of the foregoing technical solutions.

In some embodiments, the engineering machine comprises an excavator.

According to yet another aspect of the embodiments of the present disclosure, a relay protection control method is provided, which is applied to the aforementioned relay protective apparatus, the relay protection control method comprising:

- acquiring a voltage of an output connection point of a relay protection circuit;
- if the voltage of the output connection point of the relay protection circuit is less than a first threshold and not less than a second threshold, controlling a pull-in coil and a release coil of the relay protection circuit to be powered alternately, so that a contact of the relay protection circuit oscillates;
- wherein the first threshold is less than a standard working voltage of a bistable relay, and the second threshold is a minimum allowable working voltage of the bistable relay.

In some embodiments, the relay protection control method further comprises:

- if the voltage of the output connection point is not less than the first threshold or the number of times the contact oscillating continuously is not less than a preset number of times, triggering the pull-in coil to close the contact.

In some embodiments, acquiring a voltage of an output connection point of a relay protection circuit comprises:

- acquiring the voltage of the output connection point of the relay protection circuit at every preset interval.

In some embodiments, the relay protection control method further comprises:

- if the voltage of the output connection point of the relay protection circuit is zero, sending first fault indication information;
- if the voltage of the output connection point of the relay protection circuit is greater than zero and less than the second threshold, sending second fault indication information.

According to yet another aspect of the embodiments of the present disclosure, a relay protection control apparatus is provided, comprising:

- an acquisition unit for acquiring a voltage of an output connection point of a relay protection circuit;
- a control unit for if the voltage of the output connection point of the relay protection circuit is less than a first threshold and not less than a second threshold, controlling a pull-in coil and a release coil of the relay protection circuit to be powered alternately, so that a contact of the relay protection circuit oscillates;
- wherein the first threshold is less than a standard working voltage of a bistable relay, and the second threshold is a minimum allowable working voltage of the bistable relay.

According to yet another aspect of the embodiments of the present disclosure, a relay protection control apparatus is provided, comprising:

- memory; and
- a processor coupled to the memory, the processor being configured to execute the relay protection control method described in any one of the preceding technical solutions based on instructions stored in the memory.

According to yet another aspect of the embodiments of the present disclosure, a non-transitory computer-readable storage medium is provided, on which a computer program is stored, which when executed by a processor implements the relay protection control method described in any of the foregoing technical solutions.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a portion of this specification, illustrate embodiments of the present disclosure and, together with the description, serve to explain the principles of the present disclosure.

The present disclosure will be more clearly understood from the following detailed description with reference to the accompanying drawings, in which.

Figure 1:
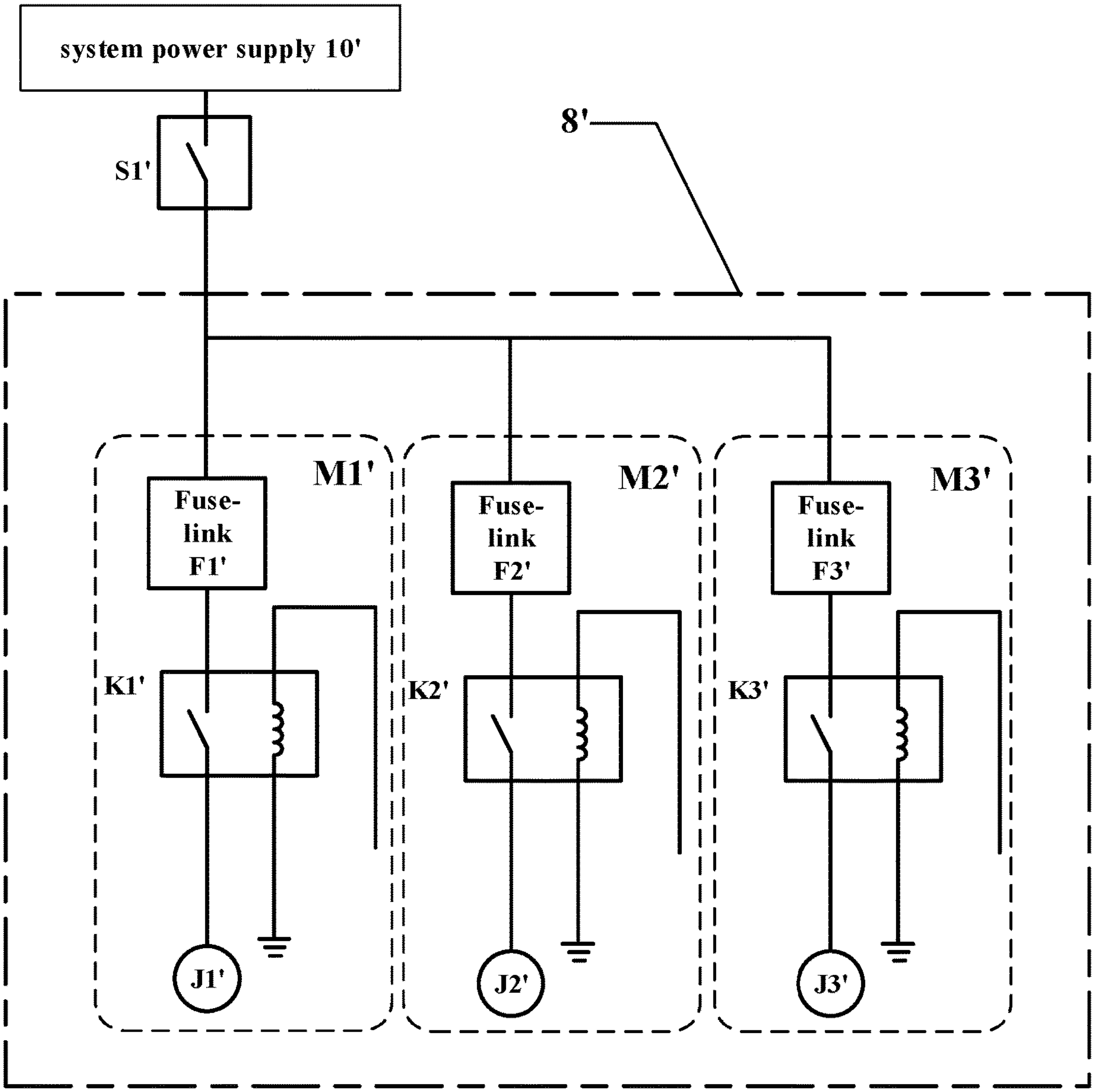
FIG. 1 is a schematic diagram of a relay protective apparatus of an excavator in the related art.

It should be understood that the dimensions of the various parts shown in the drawings are not drawn to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is in fact merely illustrative and is in no way intended as a limitation to the present disclosure, its application or use. The present disclosure may be implemented in many different forms, not limited to the embodiments described herein. These embodiments are provided so that this disclosure will be thorough and complete, and will fully convey the scope of the disclosure to those skilled in the art. Notice that, unless specifically stated otherwise, relative arrangement of components and steps set forth in these embodiments are to be construed as merely illustrative, and not as a limitation.

Unless otherwise defined, all terms (comprising technical and scientific terms) used herein have the same meaning as commonly understood by one of ordinary skill in the art to which exemplary embodiments in accordance with principles of inventive concepts belong. It will also be understood that terms defined in such general-purpose dictionaries should be interpreted as having a meaning that is consistent with their meaning in the context of the relevant art, and not to be interpreted in an idealized or overly formal sense, unless explicitly defined herein.

Techniques, methods, and apparatus known to those of ordinary skill in the relevant art may not be discussed in detail, but where appropriate, these techniques, methods, and apparatuses should be considered as part of the specification.

As shown in FIG. 1, a relay protective apparatus 8' applied to an excavator in the related art comprises a power circuit relay protection module M1', a startup circuit relay protection module M2', and a preheating circuit relay protection module M3' arranged in parallel. Each relay protection module comprises a fuse-link (such as fuse-links F1', F2', F3'), a relay (such as relays K1', K2', K3') and an output connection point (such as output connection points J1', J2', J3'). The relay protective apparatus 8' is applied in the electrical system of the excavator. A system power supply 10', a main power switch S1', a fuse-link, a relay's contact, and an output connection point are connected in sequence.

In the process of realizing the embodiments of the present disclosure, the inventor noticed that in the above mentioned related art, when a relay is in its normal working state, its coil will always be powered, which may generate a relatively large amount of heat. In addition, the contact will always be in a pull-in state because the coil is powered, and its lifespan will be shortened accordingly; moreover, since the three relay protection modules are arranged inside an electrical box, it is not easy to detect relay failure, leading to poor repairability. These factors seriously affect the reliability of the relay protective apparatus, which in turn affects the reliability of the excavator's electrical system. How to improve the reliability of relay protective apparatus and prolong its service life is a technical problem that needs to be solved urgently.

Embodiments of the present disclosure provide a relay protective apparatus, an engineering machine, a relay protection control method and apparatus, and a non-transitory computer-readable storage medium, so as to improve the reliability of the relay protective apparatus, prolong its service life, and further improve the reliability of the electrical system of the engineering machine.

Some embodiments of the present disclosure provide a relay protective apparatus, which can be applied to various types of engineering machines that require relay protection, and can bring about similar beneficial effects. The specific type of the engineering machine is not limited, for example, it can be an excavator, a road roller, a crane, and the like. The following description will be given with an example in which a relay protective apparatus is applied to an excavator.

Figure 2:
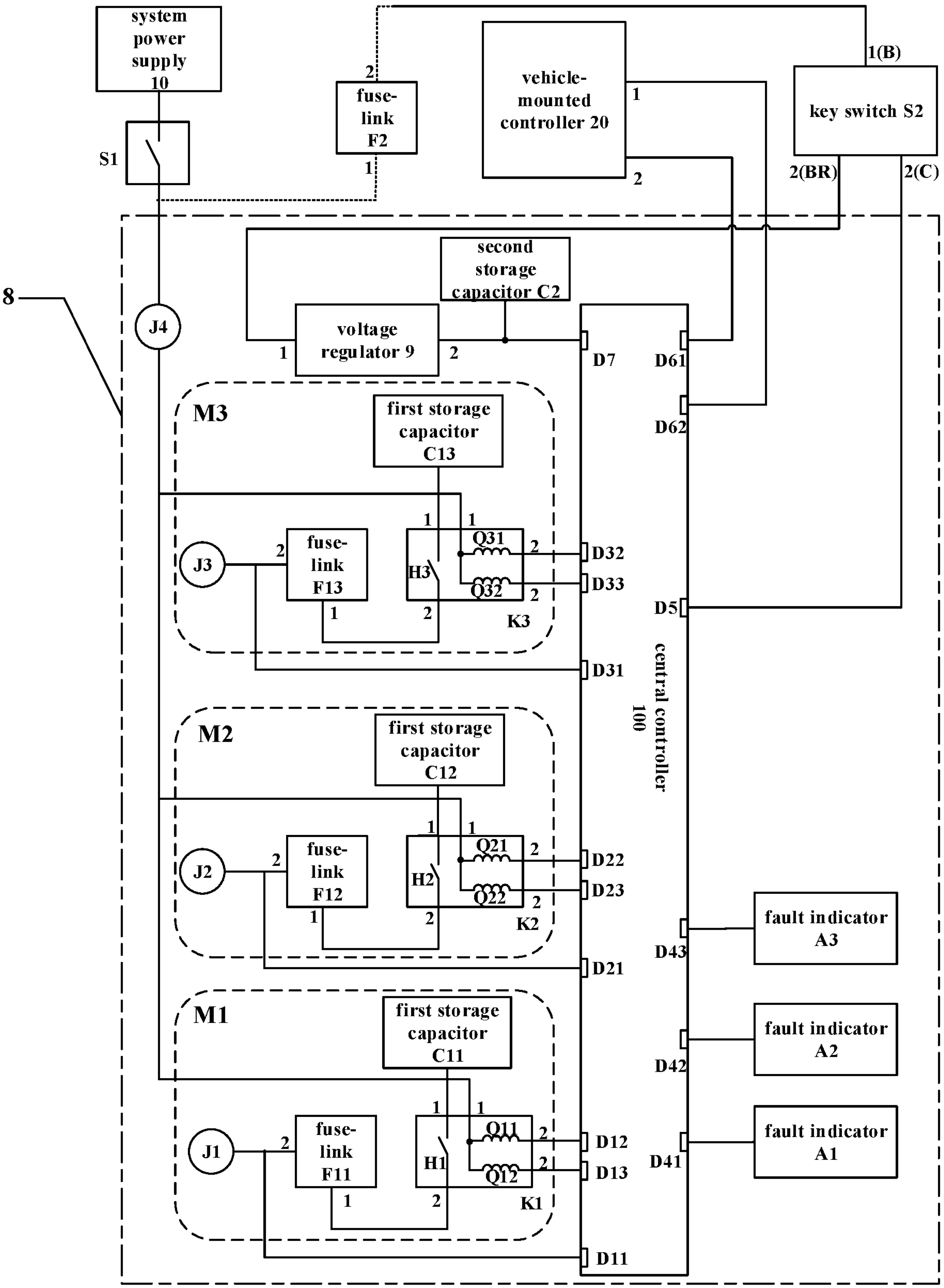
FIG. 2 is a schematic diagram of a relay protective apparatus according to some embodiments of the present disclosure.

As shown in FIG. 2, some embodiments of the present disclosure provide a relay protective apparatus 8, which comprises a power input connection point J4, at least one relay protection circuit, and a central controller 100. The relay protection circuit is, for example, a power circuit relay protection circuit M1, a startup circuit relay protection circuit M2, or a preheating circuit relay protection circuit M3 shown in the figure. Wherein the power input connection point J4 can be understood as a terminal used by the relay protective apparatus 8 to connect with an external system power supply.

The power circuit relay protection circuit M1 comprises a bistable relay K1 and an output connection point J1. The bistable relay K1 comprises a contact H1, a pull-in coil Q11 and a release coil Q12. An input terminal of the contact H1 (the input terminal of each device is represented by "1", and the output terminal is represented by "2" in FIG. 2), an input terminal of the pull-in coil Q11 and an input terminal of the release coil Q12 are connected to the power input connection point J4. An output terminal of the contact H1 is connected to an output connection point J1. The output connection point J1 is a terminal used by the relay protective apparatus 8 to connect with an external power circuit.

Similarly, the startup circuit relay protection circuit M2 comprises a bistable relay K2 and an output connection point J2. The bistable relay K2 comprises a contact H2, a pull-in coil Q21 and a release coil Q22. An input terminal of the contact H2, an input terminal of the pull-in coil Q21 and an input terminal of the release coil Q22 are connected to the power input connection point J4. An output terminal of the contact H2 is connected to an output connection point J2. The output connection point J2 is a terminal used by the relay protective apparatus 8 to connect with an external startup circuit.

Similarly, the preheating circuit relay protection circuit M3 comprises a bistable relay K3 and an output connection point J3. The bistable relay K3 comprises a contact H3, a pull-in coil Q31 and a release coil Q32. An input terminal of the contact H3, an input terminal of the pull-in coil Q31 and an input terminal of the release coil Q32 are connected to the power input connection point J4. An output terminal of the contact H3 is connected to an output connection point J3. The output connection point J3 is a terminal used by the relay protective apparatus 8 to connect with an external preheating circuit.

The central controller 100 comprises first ports D11, D21, D31, second ports D12, D22, D32, and third ports D13, D23, D33, wherein the first port D11 is connected to the output connection point J1, and the first port D21 is connected to the output connection point J2, the first port D31 is connected to the output connection point J3, the second port D12 is connected to the output terminal of the pull-in coil Q11, the second port D22 is connected to the output terminal of the pull-in coil Q21, the second port D32 is connected to the output terminal of the pull-in coil Q31, the third port D13 is connected to the output terminal of the release coil Q12, the third port D23 is connected to the output terminal of the release coil Q22, and the third port D33 is connected to the output terminal of the release coil Q32.

The central controller 100 is used to control the pull-in coil Q11 and the release coil Q12 to be powered alternately when the voltage of the output connection point J1 is less than a first threshold and not less than a second threshold, so that the contact H1 oscillates, that is, to frequently open and close the contact H1;

control the pull-in coil Q21 and the release coil Q22 to be powered alternately when the voltage of the output connection point J2 is less than the first threshold and not less than the second threshold, so that the contact H2 oscillates, that is, to frequently open and close the contact H2; and control the pull-in coil Q31 and the release coil Q32 to be powered alternately when the voltage of the output connection point J3 is less than the first threshold and not less than the second threshold, so that the contact H3 oscillates, that is, to frequently open and close the contact H3;

wherein the first threshold is less than a standard working voltage of a bistable relay, and the second threshold is a minimum allowable working voltage of the bistable relay.

The standard working voltage of the bistable relay is an ideal working voltage of the bistable relay. When the voltage of the output connection point is less than the first threshold but not less than the second threshold, the contact performance of the contact is reduced, but it will not cause the bistable relay to not work properly. The first threshold can be determined through multiple tests in combination with the structure and performance of the bistable relay, and is a preset value.

In the electrical system of the excavator, in addition to the relay protective apparatus 8 described above, it usually also comprises a system power supply 10, a main power switch S1, a key switch S2, a vehicle-mounted controller 20, and the like. The key switch S2 comprises a power input terminal B, a power-on output terminal BR and a startup output terminal C. The power input terminal B of the key switch S2 is connected to the main power switch S1, and a fuse F2 can be disposed on the line between the main power switch S1 and the power input terminal B to protect the line from overcurrent and short circuit. In addition to the first ports D11, D21, D31, the second ports D12, D22, D32 and the third ports D13, D23, D33, the central controller 100 further comprises a power port D7, a fourth port D41 connected to a fault indicator A1, a fourth port D42 connected to a fault indicator A2, a fourth port D43 connected to a fault indicator A3, a fifth port D5 connected to the startup output terminal C of the key switch S2, and sixth ports D61 and D62 connected to the vehicle-mounted controller 20.

The power circuit, the startup circuit and the preheating circuit are three basic load circuits of the excavator's electrical system. In this embodiment of the present disclosure, three relay protection circuits are respectively provided for these three basic load circuits in the relay protective apparatus 8, that is, the above mentioned power circuit relay protection circuit M1, startup circuit relay protection circuit M2, and preheating circuit relay protection circuit M3. Each relay protection circuit is connected to a corresponding load circuit through an output connection point (other parts of the load circuit are omitted and not shown in the figure).

As shown in FIG. 2, in some embodiments of the present disclosure, the relay protective apparatus 8 further comprises a voltage regulator 9, and an input terminal of the voltage regulator 9 is connected to the power-on output terminal BR of the key switch S2. The power port D7 of the central controller 100 is connected to an output terminal of the voltage regulator 9. The voltage regulator 9 is, for example, a low dropout linear voltage regulator (LDO), whose input terminal supports a wide voltage range, and can support a maximum voltage input of 42V, and its output terminal outputs a steady-state DC voltage, for example, a 5V DC voltage, so as to provide a stable working voltage for the central controller 100.

In the embodiment of the present disclosure, the relay protection circuit is a bistable relay with two stable states. As shown in FIG. 2, taking the bistable relay K1 as an example, when a grounding voltage is output to the pull-in coil Q11 at a first timing, the contact H1 changes from a normally open state to a normally closed state, and after the pull-in coil Q11 is powered off, the contact H1 can still maintain the normally closed state due to the magnetism of a polarized soft magnet; when a grounding voltage is output to the release coil Q12 at a second timing, the contact H1 changes from a normally closed state to a normally open state, and after the release coil Q12 is powered off, the contact H1 can still maintain the normally open state due to the magnetism of a polarized soft magnet. The bistable relay does not require its coil to be powered all the time to maintain the pull-in state of the contact. Therefore, it has the advantages of energy saving and low heat generation of the coil.

In some embodiments of the present disclosure, the central controller 100 is used to control the power circuit relay protection circuit M1 to work when receiving a power-on signal from the power-on output terminal BR of the key switch S2; control the startup circuit relay protection circuit M2 to work when receiving a startup signal from the startup output terminal C of the key switch S2 in the power-on state; and control the preheating circuit relay protection circuit M3 to work when receiving a start-to-preheat signal from the vehicle-mounted controller 20 in the power-on state.

For example, after the main power switch S1 is closed, when an operator turns the key switch S2 to the power-on output terminal BR, the power-on output terminal BR is powered, and power is supplied to the power port D7 of the central controller 100 through the voltage regulator 9. After the central controller 100 receives a power-on signal, it outputs a grounding voltage to the pull-in coil Q11 of the bistable relay K1 in the power circuit relay protection circuit M1, so that the contact H1 changes from a normally open state to a normally closed state, so as to turn on the power circuit of the excavator. While the power circuit is in the turn-on state, when it is detected that the voltage of the output connection point J1 is less than the first threshold and not less than the second threshold, it can be determined that the contact performance of the contact H1 in the power circuit relay protection circuit M1 is reduced. In this case, the pull-in coil Q11 and the release coil Q12 are controlled to be alternately powered through, for example, outputting a grounding voltage to the pull-in coil Q11 and the release coil Q12 alternately, so that the contact H1 oscillates and is rapped repeatedly, which can effectively reduce the accumulation of foreign objects on the contact H1, thereby improving the electrical contact performance of the contact H1.

For example, after the power circuit is turned on, when the operator turns the key switch S2 to the startup output terminal C, the startup output terminal C outputs a high-level startup signal to the central controller 100. After receiving the startup signal from the startup output terminal C, the central controller 100 outputs a grounding voltage to the pull-in coil Q21 of the bistable relay K2 in the startup circuit relay protection circuit M2, so that the contact H2 changes from the normally open state to the normally closed state, so as to turn on the startup circuit of the excavator. While the startup circuit is in the turn-on state, when the voltage of the output connection point J2 is less than the first threshold and not less than the second threshold, it can be determined that the contact performance of the contact H2 in the startup circuit relay protection circuit M2 is reduced. In this case, the pull-in coil Q21 and the release coil Q22 are controlled to be alternately powered through, for example, outputting a grounding voltage to the pull-in coil Q21 and the release coil Q22 alternately, so that the contact H2 oscillates and is rapped repeatedly, which can effectively reduce the accumulation of foreign objects on the contact H2, thereby improving the electrical contact performance of the contact H2.

For example, after the power circuit is turned on, when the operator operates a Preheat button on the excavator's console, the vehicle-mounted controller 20 outputs a start-to-preheat signal to the central controller 100. After receiving the start-to-preheat signal from the vehicle-mounted controller 20, the central controller 100 outputs a grounding voltage to the pull-in coil Q31 of the bistable relay K3 in the preheating circuit relay protection circuit M3, so that the contact H3 changes from the normally open state to the normally closed state, so as to turn on the preheating circuit of the excavator. While the preheating circuit is in the turn-on state, when the voltage of the output connection point J3 is less than the first threshold and not less than the second threshold, it can be determined that the contact performance of the contact H3 in the (preheating circuit) relay protection circuit M3 is reduced. In this case, the pull-in coil Q31 and the release coil Q32 are controlled to be alternately powered through, for example, outputting a grounding voltage to the pull-in coil Q31 and the release coil Q32 alternately, so that the contact H3 oscillates and is rapped repeatedly, which can effectively reduce the accumulation of foreign objects on the contact H3, thereby improving the electrical contact performance of the contact H3.

In some embodiments of the present disclosure, the sixth ports D61 and D62 of the central controller 100 are used for connecting with the vehicle-mounted controller 20 through a controller area network (CAN) bus. In some embodiments, the sixth port D61 is used for reporting information to the vehicle-mounted controller 20, and the sixth port D62 is used for receiving information sent by the vehicle-mounted controller 20, thereby realizing mutual communication. The specific number of the sixth ports is not limited and can be designed according to practical needs.

In some embodiments of the present disclosure, the contact structure in the relay protection circuit can be made of red copper stripes, which has good electrical conductivity, thermal conductivity, weldability and corrosion resistance.

It can be understood that, if the relay protective apparatus provided by the embodiments of the present disclosure is applied in other engineering machines, the number of relay protection circuits can be adjusted as required, and the specific structure of the electrical system may also be different.

In the related art, when a relay of the relay protection circuit is in its normal working state, its coil is always powered, which may generate a relatively large amount of heat. In addition, the contact is always in a pull-in state because the coil is powered. The long-term large current flowing through the contact makes the contact easy to be oxidized, and it is also easy to accumulate foreign objects on the contact. Over time, it will not only affect the reliability of the contact performance of the contact, but also shorten its service life.

In the embodiment of the present disclosure, a bistable relay is adopted in the relay protection circuit, which does not require the coil to be powered all the time to maintain the pull-in state of the contact, having the advantages of energy saving and low heat generation of the coil, capable of effectively improving the oxidation phenomenon of the contact and prolonging the service life of the contact. On the other hand, in the technical solution of the embodiments of the present disclosure, when the voltage of the output connection point (of a contact) is less than the first threshold and not less than the second threshold, it can be determined that the contact's performance is reduced. In this case, the pull-in coil and the release coil are controlled to be alternately powered through, for example, outputting a grounding voltage to the pull-in coil and the release coil alternately, so that the contact oscillates and is rapped repeatedly, which can effectively reduce the accumulation of foreign objects on the contact, thereby improving the contact's electrical contact reliability. Therefore, by adopting the technical solution of the embodiments of the present disclosure, the reliability of the relay protective apparatus can be effectively improved, the service life thereof can be prolonged, and the reliability of the electrical system of the engineering machine can be improved.

In addition, in the embodiment of the present disclosure, a platform-based and integrated design is adopted for the relay protective apparatus. The various relay protection circuits, the voltage regulator and other components are integrated with the central controller, resulting in a compact structure, that is, the device has a compact appearance and volume, and its cost is greatly reduced.

In a further embodiment of the present disclosure, the central controller 100 is further used for triggering the pull-in coil to close the contact if the voltage of each of above output connection points is not less than the first threshold or the number of times the contact oscillating continuously is not less than a preset number of times. As described above, through causing the contact to oscillate and rapping the contact repeatedly, the electrical contact performance of the contact can be improved and the contact resistance can be reduced. After certain conditions are met, the pull-in coil can be triggered to close the contact and restore the normal operation of the bistable relay. The preset number of times can be determined in combination with the performance of the bistable relay and experience, for example, the preset number of times may be set to 5.

In some embodiments of the present disclosure, the central controller 100 is used for acquiring the voltage of the output connection point at every preset interval, i.e., according to a preset maintenance cycle.

Wherein the preset interval can be determined through multiple tests in combination with the structure, working performance, rated service life, etc. of the bistable relay. For example, in some embodiments, the acquisition of the voltage of the output connection point and the self-check and improvement maintenance of contact performance are carried out every 500 hours. With the solution of this embodiment, a number of times of the contact can be closed normally can be guaranteed, which is beneficial to prolong the service life of the contact and ensure that the bistable relay is in its normal working state most of the time.

Referring to FIG. 2, in some embodiments of the present disclosure, the relay protective apparatus 8 may further comprise a fault indicator A1 provided for the power circuit relay protection circuit M1, and a fault indicator A2 provided for the startup circuit relay protection circuit M2, and a fault indicator A3 provided for the preheating circuit relay protection circuit M3. The specific type of the fault indicator is not limited, for example, it may be an indicator light or a buzzer. The central controller 100 is connected to the fault indicator A1 through a fourth port D41, is connected to the fault indicator A2 through a fourth port D42, and is connected to the fault indicator A3 through a fourth port D43. The central controller 100 is further used to control the fault indicator A1 to send first fault indication information when the voltage of the output connection point J1 is zero, and to control the fault indicator A1 to send second fault indication information when the voltage of the output connection point J1 is greater than zero and less than the second threshold; control the fault indicator A2 to send first fault indication information when the voltage of the output connection point J2 is zero, and to control the fault indicator A2 to send second fault indication information when the voltage of the output connection point J2 is greater than zero and less than the second threshold; and control the fault indicator A3 to send first fault indication information when the voltage of the output connection point J3 is zero, and to control the fault indicator A3 to send second fault indication information when the voltage of the output connection point J3 is greater than zero and less than the second threshold.

Taking the power circuit relay protection circuit M1 as an example, when the voltage of the output connection point J1 is zero, it can be determined that the load circuit in which the power circuit relay protection circuit M1 is located is open, and the fault indicator A1 sends first fault indication information, for example, an indicator light is lighted or a buzzer keeps long beeps, so that the operator can be notified of the fault in time. When the voltage of the output connection point J1 is greater than zero and less than the second threshold, it can be determined that the contact resistance of the contact H1 is too large, which has seriously affected the normal operation and relay protection of the load circuit. In this case, the fault indicator A1 sends second fault indication information, for example, an indication light flashes or a buzzer keeps short beeps, so that the operator can be notified of the fault in time. With the technical solution of this embodiment, automatic fault diagnosis and prompt can be realized, so as to improve the intelligence level of the relay protective apparatus.

In addition, in some embodiments of the present disclosure, when the central controller 100 determines that a certain load circuit has an open-circuit fault or an excessive contact resistance fault, it can also report a corresponding fault code to the vehicle-mounted controller 20 through the sixth port D61. The vehicle-mounted controller 20 can analyze the fault and perform self-diagnosis, and then output a diagnosis result to an output device, such as a display screen and an indicator light.

In some embodiments of the present disclosure, as shown in FIG. 2, the power circuit relay protection circuit M1 may further comprise a first storage capacitor C11 and a fuse-link F11, wherein the input terminal of the contact H1, the input terminal of the pull-in coil Q11, and the input terminal of the release coil Q12 are also connected to an output terminal of the first storage capacitor C11; the fuse-link F11 is connected in series with the bistable relay K1, with an input terminal of the fuse-link F11 connected to the output terminal of the contact H1, and an output terminal of the fuse-link F11 connected to the output connection point J1. The startup circuit relay protection circuit M2 may further comprise a first storage capacitor C12 and a fuse-link F12, wherein the input terminal of the contact H2, the input terminal of the pull-in coil Q21, and the input terminal of the release coil Q22 are also connected to an output terminal of the first storage capacitor C12; the fuse-link F12 is connected in series with the bistable relay K2, with an input terminal of the fuse-link F12 connected to the output terminal of the contact H2, and an output terminal of the fuse-link F12 connected to the output connection point J2. The preheating circuit relay protection circuit M3 may further comprise a first storage capacitor C13 and a fuse-link F13, wherein the input terminal of the contact H3, the input terminal of the pull-in coil Q31, and the input terminal of the release coil Q32 are also connected to an output terminal of the first storage capacitor C13; the fuse-link F13 is connected in series with the bistable relay K3, with an input terminal of the fuse-link F13 connected to the output terminal of the contact H3, and an output terminal of the fuse-link F13 connected to the output connection point J3.

As a protection device, the fuse-link can perform short-circuit and over-current protection for the load circuit to prevent the device from being burned. The first storage capacitor can supply power to the release coil when the power supply to the bistable relay is abnormally cut off, for example, when the main power switch of the system is abnormally switched off, thereby ensuring that the release coil can be released normally.

Referring to FIG. 2, in some embodiments of the present disclosure, the relay protective apparatus 8 further comprises a second storage capacitor C2, wherein the power port D7 of the central controller 100 is connected to both the output terminal of the voltage regulator 9 and the output terminal of the second storage capacitor C2. The second storage capacitor C2 can continue to supply power to the central controller 100 after the power-on output terminal BR of the key switch is de-powered. On the one hand, it can ensure that the release coil of the bistable relay can be released normally, preventing the system from generating static power consumption due to leakage current. On the other hand, it can realize the vehicle controller 20's delay control on the central controller 100.

To sum up, the relay protective apparatus of the above embodiments of the present disclosure not only has better reliability of relay protection for the load circuit, but also has a longer service life and a higher degree of integration and intelligence, which can effectively improve the reliability and intelligence of the engineering machine's electrical system.

Some embodiments of the present disclosure further provide an engineering machine, comprising the relay protective apparatus described in any of the foregoing embodiments. The specific type of the engineering machine comprises, but is not limited to, an excavator, for which the reliability and intelligence of its electrical system can be effectively improved.

Figure 3:
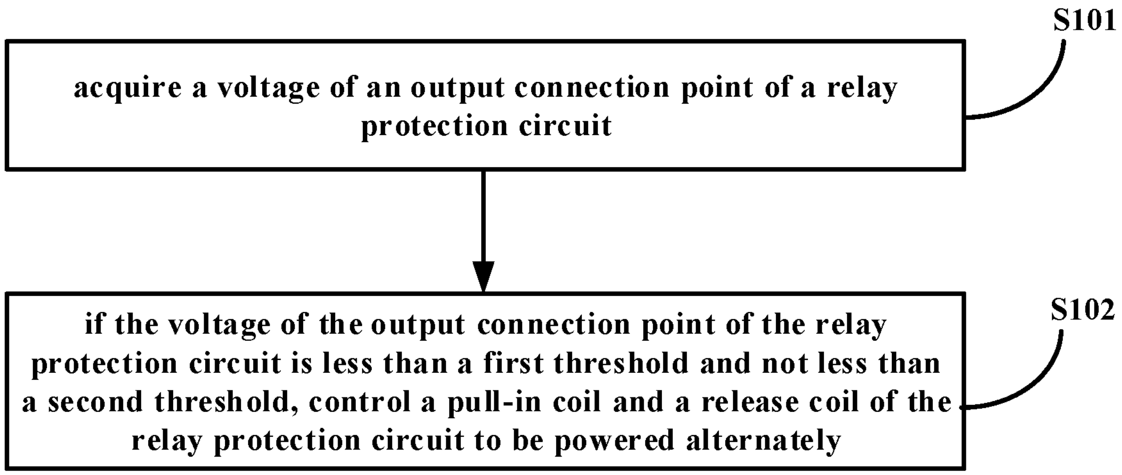
FIG. 3 is a flowchart of a relay protection control method according to some embodiments of the present disclosure.

As shown in FIG. 3, some embodiments of the present disclosure further provide a relay protection control method applied to the aforementioned relay protective apparatus, the method comprising steps S101 to S102:

Step S101: acquiring a voltage of an output connection point of a relay protection circuit;

Step S102: if the voltage of the output connection point of the relay protection circuit is less than a first threshold and not less than a second threshold, controlling a pull-in coil and a release coil of the relay protection circuit to be powered alternately, so that a contact of the relay protection circuit oscillates;

wherein the first threshold is less than a standard working voltage of a bistable relay, and the second threshold is a minimum allowable working voltage of the bistable relay.

In some embodiments of the present disclosure, the relay protection control method further comprises the following step:

if the voltage of the output connection point is not less than the first threshold or the number of times the contact oscillating continuously is not less than a preset number of times, triggering the pull-in coil to close the contact.

In some embodiments of the present disclosure, acquiring a voltage of an output connection point of a relay protection circuit comprises:

acquiring the voltage of the output connection point of the relay protection circuit at every preset interval.

In some embodiments of the present disclosure, the relay protection control method further comprises the following step:

if the voltage of the output connection point of the relay protection circuit is zero, sending first fault indication information;

if the voltage of the output connection point of the relay protection circuit is greater than zero and less than the second threshold, sending second fault indication information.

In the technical solution of the embodiments of the present disclosure, when the voltage of the output connection point (of a contact) is less than the first threshold and not less than the second threshold, it can be determined that the contact's performance is reduced. In this case, the pull-in coil and the release coil are controlled to be alternately powered through, for example, outputting a grounding voltage to the pull-in coil and the release coil alternately, so that the contact oscillates and is rapped repeatedly, which can effectively reduce the accumulation of foreign objects on the contact, thereby improving the contact's electrical contact reliability. Through causing the contact to oscillate and rapping the contact repeatedly, the electrical contact performance of the contact can be improved, and the contact resistance can be reduced. After certain conditions are met, the pull-in coil can be triggered to close the contact and restore the normal operation of the bistable relay. When a load circuit has an open circuit fault or an excessive contact resistance fault, first fault indication information or second fault information issued can prompt the operator to intervene in time, which can realize automatic fault diagnosis and prompt, thereby improving the degree of intelligence. Therefore, through adopting the relay protection control method of the embodiment of the present disclosure, the reliability of the relay protective apparatus can be effectively improved, the service life thereof can be prolonged, and the reliability of the electrical system of the engineering machine can be improved.

Figure 4:
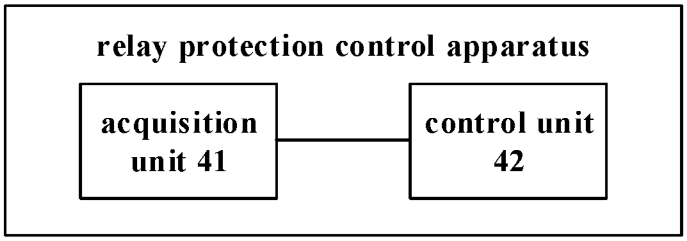
FIG. 4 is a block diagram of a relay protection control apparatus according to some embodiments of the disclosure.

As shown in FIG. 4, some embodiments of the present disclosure further provide a relay protection control apparatus, comprising:

- an acquisition unit 41 for acquiring a voltage of an output connection point of a relay protection circuit;
- a control unit 42 for, if the voltage of the output connection point of the relay protection circuit is less than a first threshold and not less than a second threshold, controlling a pull-in coil and a release coil of the relay protection circuit to be powered alternately, so that a contact of the relay protection circuit oscillates;
- wherein the first threshold is less than a standard working voltage of a bistable relay, and the second threshold is a minimum allowable working voltage of the bistable relay.

Figure 5:
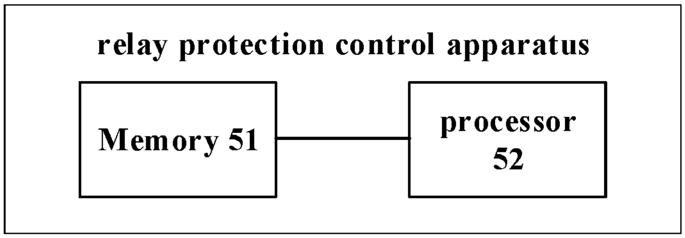
FIG. 5 is a block diagram of a relay protection control apparatus according to other embodiments of the disclosure.

As shown in FIG. 5, some embodiments of the present disclosure further provide a relay protection control apparatus, comprising: a memory 51 and a processor 52 coupled to the memory 51, the processor 52 being configured to execute the relay protection control method described in any one of the foregoing embodiments based on instructions stored in the memory 51.

It should be understood that each step in the foregoing relay protection control method may be implemented by a processor, and may be implemented in any of software, hardware, firmware, or a combination thereof.

In addition to the relay protection control method and apparatus described above, the embodiments of the present disclosure may also take the form of a computer program product implemented on one or more non-volatile storage media containing computer program instructions. Thus, some embodiments of the present disclosure further provide a computer-readable storage medium, on which a computer program is stored, which when executed by a processor implements the relay protection control method described in any of the foregoing technical solutions.

Figure 6:
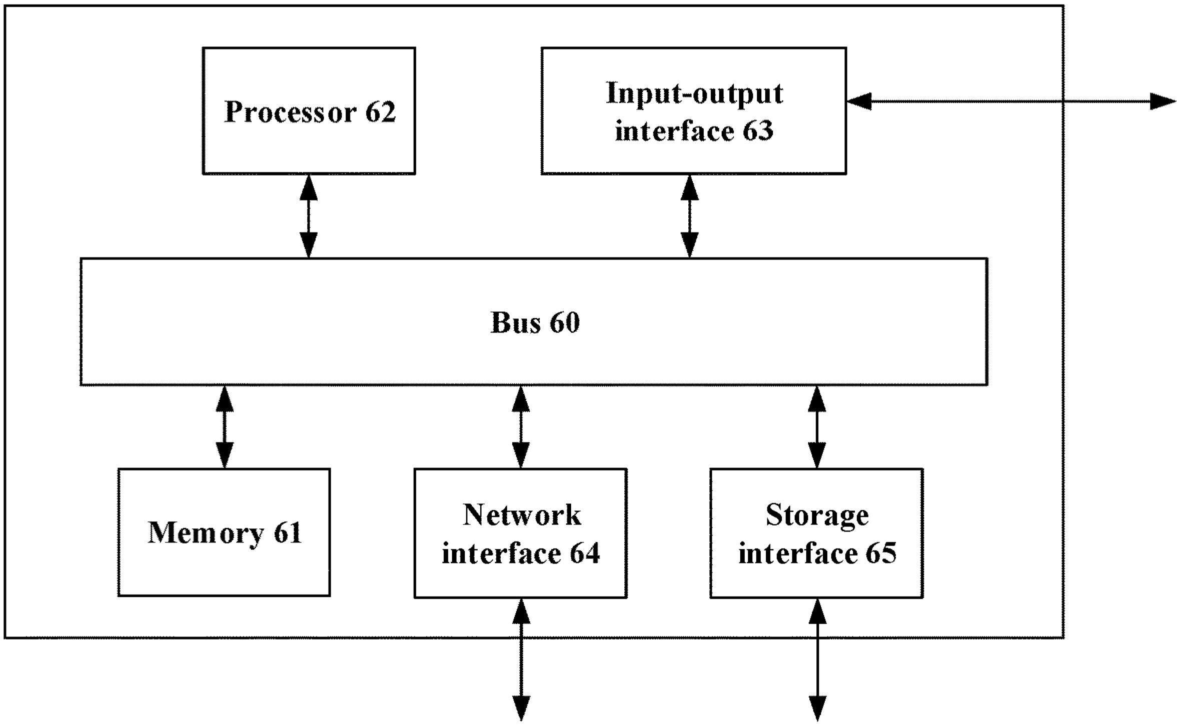
FIG. 6 is a block diagram of a computer system of some embodiments of the present disclosure.

FIG. 6 shows a structural diagram of a computer system according to some embodiments of the present disclosure. As shown in FIG. 6, the computer system may be in the form of a general-purpose computing device, and the computer system may be used to implement the relay protection control method of the foregoing embodiments. The computer system comprises a memory 61, a processor 62, and a bus 60 connecting different system components.

The memory 61 may comprise, for example, a system memory, a non-volatile storage medium, and the like. The system memory stores, for example, an operating system, application programs, a boot loader (Boot Loader), and other programs. The system memory may comprise a volatile storage medium such as random access memory (RAM) and/or cache memory. The non-volatile storage medium stores, for example, instructions for executing a corresponding embodiment of the relay protection control method described above. The non-volatile storage medium comprises, but not limited to, magnetic disk storage, optical storage, flash memory, and the like.

The processor 62 may be implemented by discrete hardware components such as a general-purpose processor, a digital signal processor (DSP), an application specific integrated circuit (ASIC), a field programmable gate array (FPGA), or other programmable logic devices, discrete gates, or transistors. Accordingly, each device such as the judgment device and the determination device may be implemented by a central processing unit (CPU) running instructions that execute the corresponding steps, or may be implemented by a dedicated circuit that executes the corresponding steps.

The bus 60 may has any of a variety of bus structures. For example, these structures comprise, but are not limited to, an Industry Standard Architecture (ISA) bus, a Micro Channel Architecture (MAC) bus, and peripheral component interconnects (PCI) bus.

The computer system may further comprise an input-output interface 63, a network interface 64, a storage interface 65, and the like. These interfaces 63, 64, 65, the memory 61 and the processor 62 may be connected through a bus 60. The input/output interface 63 may provide a connection interface for input/output devices such as a display, a mouse, and a keyboard. The network interface 64 provides a connection interface for various networked devices. The storage interface 65 provides a connection interface for external storage devices such as a floppy disk, a flash disk, or an SD card.

In the technical solution of the above embodiment of the present disclosure, a bistable relay is adopted in the relay protection circuit, which has the advantages of energy saving and low heat generation of the coil, capable of effectively improving the oxidation phenomenon of the contact and prolonging the service life of the contact. On the other hand, when the voltage of the output connection point (of a contact) is less than the first threshold and not less than the second threshold, the pull-in coil and the release coil are controlled to be alternately powered, so that the contact oscillates and is rapped repeatedly, which can effectively reduce the accumulation of foreign objects on the contact, thereby improving the contact's electrical contact reliability. Therefore, by adopting the technical solution of the embodiments of the present disclosure, the reliability of the relay protective apparatus can be effectively improved, the service life thereof can be prolonged, and the reliability of the electrical system of the engineering machine can be improved.

Heretofore, various embodiments of the present disclosure have been described in detail. In order to avoid obscuring the concepts of the present disclosure, some details known in the art are not described. Based on the above description, those skilled in the art can understand how to implement the technical solutions disclosed herein.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified or equivalently substituted for part of the technical features without departing from the scope and spirit of the present disclosure. The scope of the disclosure is defined by the following claims.

What is claimed is:

1. A relay protective apparatus, comprising:

a power input connection point;

a relay protection circuit, comprising a bistable relay and an output connection point, the bistable relay comprising a contact, a pull-in coil and a release coil, wherein an input terminal of the contact, an input terminal of the pull-in coil and an input terminal of the release coil are connected to the power input connection point, and an output terminal of the contact is connected to the output connection point; and a central controller, comprising a first port connected to the output connection point, a second port connected to an output terminal of the pull-in coil, and a third port connected to an output terminal of the release coil, the central controller being configured to control the pull-in coil and the release coil to be powered alternately to make the contact oscillate, if a voltage of the output connection point is less than a first threshold and not less than a second threshold, wherein the first threshold is less than a standard operating voltage of the bistable relay, and the second threshold is a minimum allowable operating voltage of the bistable relay;

a voltage regulator and a second storage capacitor, wherein:

an input terminal of the voltage regulator is used to connect to a power-on output terminal of a key switch; and the central controller further comprises a power port, which is connected to an output terminal of the voltage regulator and an output terminal of the second storage capacitor;

wherein the relay protection circuit comprises a power circuit relay protection circuit, a startup circuit relay protection circuit, and a preheating circuit relay protection circuit; and the central control controller further comprises a fifth port for connecting to a startup output terminal of the key switch, and a sixth port for communicating with a vehicle-mounted controller, wherein the central control controller is used for controlling the power circuit relay protection circuit to work when receiving a power-on signal from the power-on output terminal of the key switch, controlling the startup circuit relay protection circuit to work when receiving a startup signal from the startup output terminal of the key switch in a power-on state, and controlling the preheating circuit relay protection circuit to work when receiving a start-to-preheat signal from the vehicle-mounted controller in the power-on state.

2. The relay protective apparatus according to claim 1, wherein the central controller is further used for triggering the pull-in coil to close the contact if the voltage of the output connection point is not less than the first threshold or a number of times the contact oscillating continuously is not less than a preset number of times.

3. The relay protective apparatus according to claim 2, wherein the central controller is used for acquiring the voltage of the output connection point at every preset interval.

4. The relay protective apparatus according to claim 2, further comprising a fault indicator, wherein the central controller further comprises a fourth port connected to the fault indicator, and the central controller is also used for controlling the fault indicator to send a first fault indication information in case that the voltage of the output connection point is zero and controlling the fault indicator to a send second fault indication information when the voltage of the output connection point is greater than zero and less than the second threshold.

5. The relay protective apparatus according to claim 4, wherein the fault indicator comprises an indicator light or a buzzer.

6. The relay protective apparatus according to claim 1, wherein the relay protection circuit further comprises a first storage capacitor, wherein the input terminal of the contact, the input terminal of the pull-in coil and the input terminal of the release coil are further connected to an output terminal of the first storage capacitor.

7. The relay protective apparatus according to claim 6, wherein the relay protection circuit further comprises a fuse-link connected in series with the bistable relay, wherein an input terminal of the fuse-link is connected to the output terminal of the contact, and an output terminal of the fuse-link is connected to the output connection point.

8. The relay protective apparatus according to claim 1, wherein the voltage regulator is a low dropout linear voltage regulator (LDO).

9. The relay protective apparatus according to claim 1, wherein the sixth port of the central control controller is used for connecting with the vehicle-mounted controller through a controller area network (CAN) bus.

10. An engineering machine, comprising the relay protective apparatus according to claim 1.

11. The engineering machine according to claim 10, wherein the engineering machine comprises an excavator.

12. A relay protection control method applied to the relay protective apparatus of claim 1, comprising:

acquiring a voltage of an output connection point of a relay protection circuit; and controlling a pull-in coil and a release coil of the relay protection circuit to be powered alternately to make a contact of the relay protection circuit oscillate, if the voltage of the output connection point of the relay protection circuit is less than a first threshold and not less than a second threshold, wherein the first threshold is less than a standard working voltage of a bistable relay, and the second threshold is a minimum allowable working voltage of the bistable relay.

13. The relay protection control method according to claim 12, further comprising:

triggering the pull-in coil of the relay protection circuit to close the contact, if the voltage of the output connection point is not less than the first threshold or the number of times the contact oscillating continuously is not less than a preset number of times.

14. The relay protection control method according to claim 12, wherein acquiring a voltage of an output connection point of a relay protection circuit comprises:

acquiring the voltage of the output connection point of the relay protection circuit at every preset interval.

15. The relay protection control method according to claim 12, further comprising:

sending a first fault indication information, if the voltage of the output connection point of the relay protection circuit is zero; and sending a second fault indication information, if the voltage of the output connection point of the relay protection circuit is greater than zero and less than the second threshold.

16. A relay protection control apparatus, comprising:

a memory; and a processor coupled to the memory, the processor being configured to execute, based on instructions stored in the memory, the following steps applied to a relay protective apparatus:

acquiring a voltage of an output connection point of a relay protection circuit; and controlling a pull-in coil and a release coil of the relay protection circuit to be powered alternately to make a contact of the relay protection circuit oscillate, if the voltage of the output connection point of the relay protection circuit is less than a first threshold and not less than a second threshold, wherein the first threshold is less than a standard working voltage of a bistable relay, the second threshold is a minimum allowable working voltage of the bistable relay, and the relay protective apparatus comprising:

a power input connection point;

a relay protection circuit, comprising a bistable relay and an output connection point, the bistable relay comprising a contact, a pull-in coil and a release coil, an input terminal of the contact, an input terminal of the pull-in coil and an input terminal of the release coil being connected to the power input connection point, an output terminal of the contact being connected to the output connection point; and a central controller, comprising a first port connected to the output connection point, a second port connected to an output terminal of the pull-in coil, and a third port connected to an output terminal of the release coil.

17. A non-transitory computer-readable storage medium on which a computer program is stored, which when executed by a processor implements the following steps applied to a relay protective apparatus:

acquiring a voltage of an output connection point of a relay protection circuit; and controlling a pull-in coil and a release coil of the relay protection circuit to be powered alternately to make a contact of the relay protection circuit oscillate, if the voltage of the output connection point of the relay protection circuit is less than a first threshold and not less than a second threshold, wherein the first threshold is less than a standard working voltage of a bistable relay, the second threshold is a minimum allowable working voltage of the bistable relay, and the relay protective apparatus comprising:

a power input connection point;

a relay protection circuit, comprising a bistable relay and an output connection point, the bistable relay comprising a contact, a pull-in coil and a release coil, an input terminal of the contact, an input terminal of the pull-in coil and an input terminal of the release coil being connected to the power input connection point, an output terminal of the contact being connected to the output connection point; and a central controller, comprising a first port connected to the output connection point, a second port connected to an output terminal of the pull-in coil, and a third port connected to an output terminal of the release coil.

* * * * *